P. V. W. BISHOP.
Machine for Shrinking Hat Bodies.

No. 120,617. Patented Nov. 7, 1871.

Witnesses:
Chas. Nida.
Francis McArdle.

Inventor:
P. V. W. Bishop
per
Attorneys.

UNITED STATES PATENT OFFICE.

PETER V. W. BISHOP, OF MORRISTOWN, ASSIGNOR TO HIMSELF AND JEPTHA W. DUNN, OF NEWARK, NEW JERSEY.

IMPROVEMENT IN MACHINES FOR SHRINKING HAT-BODIES.

Specification forming part of Letters Patent No. 120,617, dated November 7, 1871.

*To all whom it may concern:*

Be it known that I, PETER V. W. BISHOP, of Morristown, in the county of Morris and State of New Jersey, have invented certain Improvements in Machines for Shrinking Hat-Bodies; and I do hereby declare that the following is a full, clear, and exact description thereof, which will enable others skilled in the art to make and use the same, reference being had to the accompanying drawing forming part of this specification.

My invention relates to improvements in machines for shrinking and fitting the bats or thick masses of fiber of which the hat-bodies are made; and it consists in a grooved roller, mounted in the upper part of a vat above a series of other smaller rollers, for passing the bodies through to subject them to pressure, the said grooved roller being suspended by springs in housings adapted to allow it to rise and fall, and connected by other springs to pressure-regulating lines, and the lower rollers having an endless apron working on them and suitable guide-rollers to facilitate the carrying of the bodies between them and the upper roller, which said apron may be dispensed with in some cases, the lower rollers being arranged to conduct the bodies to the entering point between the upper and lower ones.

Figure 1:
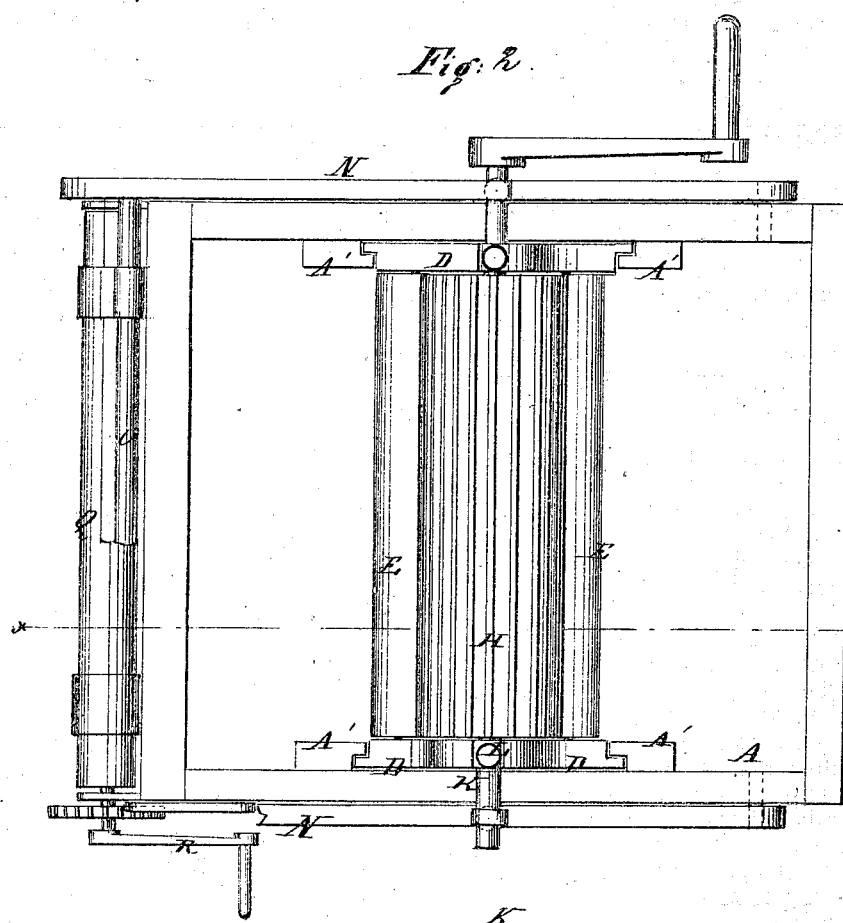
Figure 2:
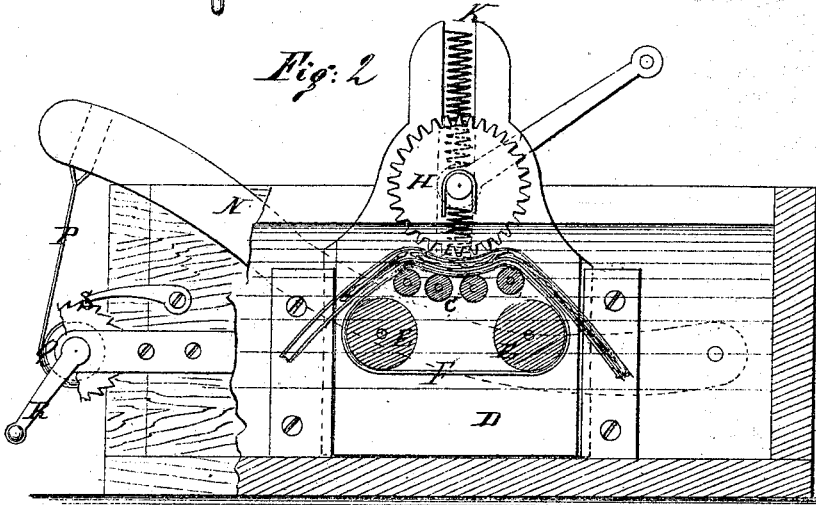

Figure 1 is a plan view of my improved machine; and Fig. 2 is a longitudinal sectional elevation taken on the line *x x* of Fig. 1.

A is the vat for containing the hat-bodies and hot water with which they are to be treated. C represents a series of two or more small rollers, mounted a short distance above the bottom in detachable housings D, with guide-rollers E below them for guiding an endless apron or belt, F, to be sometimes used for carrying the hat-bodies over the rollers C, between them and the large grooved roller H, mounted above the rollers C for acting in conjunction with them upon the hat-bodies passing between them. The journals of this roller pass through the housings D, which have vertical slots K for allowing the roller to rise and fall; and the latter is suspended by springs L for raising it, and connected by other springs M to the lever N below the journals for regulating the pressure. The said levers are connected together at their free ends by a bar, O, which is connected, by bands or straps P, to a roller, Q, having a crank, R, and ratchet and pawl, S, for pulling down said levers and holding them when great pressure upon the bodies is required.

The hat-bodies, which are in the form of bats or laps of loose wool fiber laid together on a former much larger than the finished hat, are placed in the hot water in packs between cloth, as indicated in the drawing, and passed between the rollers, which felt the fibers together and shrink them down to the density and size required much better and with less labor than by the common process of shrinking them by hand.

The grooved roller is very effective in working the fibers together on account of the alternate action of the grooves and ribs in pressing upon parts of the surface, while other parts are free, having a tendency to move the fibers on each other much like the action of the ordinary jigger employed for condensing laps into feltcloth.

In case the apron is not used I would dispense with the guide-rollers E; but said rollers will be used together with the apron; but the latter may or may not be used, as preferred.

It will be seen that the adjusting of the roller to vary the pressure, or the raising of it off the goods altogether, may be effected very readily and to any extent required.

The housings D are confined in the case by cleats A′, which admit of their being taken out readily, and the whole apparatus supported by them may be lifted out by them when required.

Having thus described my invention, I claim as new and desire to secure by Letters Patent—

1. The combination of a grooved roller, H, a series of rollers, C, and a pressure-lever, N, when said grooved roller is arranged for adjustment toward and from rollers C, and suspended by springs, and connected to the pressure-lever also by springs, substantially as specified.

2. The series of rolls H C E, combined, as described, with an endless belt, F, arranged to keep the bodies from drawing down between the small rolls.

3. The combination, with the grooved roller suspended on springs L, of the springs M, lever N, straps P, winding-shaft Q, ratchet and pawl, and crank, substantially as specified.

PETER V. W. BISHOP.

Witnesses:
EDMUND D. HALSEY,
JOHN McDEVITT.

(76)